(12) United States Patent
Sari

(10) Patent No.: US 8,363,745 B2
(45) Date of Patent: Jan. 29, 2013

(54) WIRELESS COMMUNICATIONS METHOD AND SYSTEM WITH SPATIAL MULTIPLEXING USING DUALLY POLARIZED ANTENNAS AND CORRESPONDING RECEIVER

(75) Inventor: Hikmet Sari, Charenton (FR)

(73) Assignee: Sequans Communications, Puteaux (FR)

( * ) Notice: Subject to any disclaimer, the term of this patent is extended or adjusted under 35 U.S.C. 154(b) by 573 days.

(21) Appl. No.: 12/626,744

(22) Filed: Nov. 27, 2009

(65) Prior Publication Data

US 2010/0135445 A1 Jun. 3, 2010

(30) Foreign Application Priority Data

Nov. 28, 2008 (EP) ..................................... 08170266

(51) Int. Cl.
*H04L 1/02* (2006.01)
(52) U.S. Cl. ......................................... 375/267; 375/347
(58) Field of Classification Search .................. 375/340, 375/346–349; 455/562.1
See application file for complete search history.

(56) References Cited

U.S. PATENT DOCUMENTS

| | | | |
|---|---|---|---|
| 5,724,666 A * | 3/1998 | Dent ........................... | 455/562.1 |
| 7,873,021 B2 * | 1/2011 | Petre et al. ..................... | 370/342 |
| 8,031,121 B2 * | 10/2011 | Rofougaran et al. ......... | 342/458 |
| 8,050,357 B2 * | 11/2011 | Clerckx et al. ................ | 375/299 |
| 8,060,132 B2 * | 11/2011 | Lee .............................. | 455/550.1 |
| 8,085,199 B2 * | 12/2011 | Grau Besoli et al. ......... | 342/373 |
| 2008/0280571 A1 | 11/2008 | Rofougaran et al. | |
| 2010/0135445 A1 * | 6/2010 | Sari .............................. | 375/347 |

OTHER PUBLICATIONS

European Search Report of Counterpart U.S. Appl. No. 08/170,266, filed Nov. 28, 2008.

* cited by examiner

*Primary Examiner* — Khanh C Tran
(74) *Attorney, Agent, or Firm* — David D. Brush; Westman, Champlin & Kelly, P.A.

(57) ABSTRACT

A method is provided for transmitting radio signals. Two channels are defined by two transmit antennas, having two orthogonal directions, together with two receive antennas, having two orthogonal directions. An optimal quality of one received signal is determined by signal processing, which emulates a rotation of the two orthogonal receive directions, and a mutual interference of the signals received on the two channels, due to a polarization mismatch, is cancelled, based on a corresponding optimal rotation angle.

13 Claims, 2 Drawing Sheets

WIRELESS COMMUNICATIONS METHOD AND SYSTEM WITH SPATIAL MULTIPLEXING USING DUALLY POLARIZED ANTENNAS AND CORRESPONDING RECEIVER

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

This disclosure relates to wireless communications.

BACKGROUND OF THE DISCLOSURE

Multiple antenna (MIMO) technologies have become commonplace in wireless communications systems in order to provide spatial diversity and improve performance and/or provide spatial multiplexing and increase the transmitted data rate. For instance, mobile WiMAX systems employ two MIMO profiles on the downlink:

Matrix A: This is the well-known Alamouti space-time code (STC) for transmit diversity described in S. M. Alamouti, "A Simple Transmit Diversity Technique for Wireless Communications," *IEEE Journal on Selected Areas in Communications*, vol. 16, no. 8, pp. 1451-1458, October 1998. This MIMO scheme provides diversity, but it has no spatial multiplexing gain. Although 2 transmit antennas are used, the transmitted data rate is the same as in single antenna systems. The virtue of this technique is that it provides a transmit diversity order of 2. With N antennas at the receiver, the total diversity order is 2N. Therefore, with 2 receive antennas, it leads to 4th-order diversity.

Matrix B: This scheme is based on spatial multiplexing (SM) of two data streams transmitted by the two transmit antennas. SM does not provide any diversity on the transmitter side, but, with N antennas at the receiver and maximum-likelihood detection (MLD), it provides a diversity order of N. In other words, second-order diversity can be achieved with 2 receive antennas.

There are also more advanced 2×2 MIMO schemes providing better diversity/multiplexing tradeoffs. These include the Golden code, in J.-C. Belfiore, G. Rekaya, and E. Viterbo, "The Golden Code: A 2×2 Full-Rate Space—Time Code with Nonvanishing Determinants," IEEE Transactions on Information Theory, Vol. 51, No. 4, pp. 1432-1436, April 2005, which is the best known STC of dimension 2×2, or the recently proposed STC, in the European Patent Application, EP 07 290 394.1, which provides similar performance to the Golden code while simplifying the optimum detector by orders of magnitude. The STC in said patent application is described by the coding matrix:

$$D = \begin{bmatrix} as_1 + bs_3 & -cs_2^* - ds_4^* \\ as_2 + bs_4 & cs_1^* + ds_3^* \end{bmatrix}, \quad (1)$$

where a, b, c, and d are complex-valued design parameters and the star designates complex conjugate.

In this matrix representation, the first column represents the symbol combinations transmitted during a first symbol interval and the second column represents the symbol combinations transmitted during the second symbol interval. The first row of the matrix gives the symbol combinations transmitted from the first transmit antenna, and the second row of the matrix gives the symbol combinations transmitted from the second antenna. As described in said patent application, the complexity of the maximum likelihood (ML) decoder of this code is proportional to $M^2$, where M is the size of the signal constellation.

To further increase the spatial multiplexing and the diversity gains, future standards will include MIMO systems with a larger number of antennas, for instance 4×4 MIMO schemes. There are many well-known STC designs for this type of systems. The simplest one is the pure spatial multiplexing scheme, which consists of transmitting in parallel 4 data streams using the 4 transmit antennas. Another one is the Double Alamouti scheme, which consists of transmitting one Alamouti matrix from the first two antennas and another Alamouti matrix in parallel from the other two antennas. This scheme offers a multiplexing gain of 2 (compared to 4 in the SM case), but its diversity order is 8 instead of 4 in the SM technique. More generally, one can design an STC providing a multiplexing gain of 4 and leading to high diversity and coding gains, but the complexity of the optimum decoder would be excessive for practical applications.

When the size of a MIMO system is increased, for instance by a factor 2 for upgrading a K×K MIMO system into a 2K×2K MIMO system, the complexity, or the computation load, is increased by a large factor. Consequently, more costly technologies need to be used. Furthermore, these technologies imply higher power consumption, thus causing an increased need for cooling the integrated circuits. The total cost is thus quite impacted.

SUMMARY

An aspect of the present disclosure is directed to a method for transmitting radio signals, including the following steps: from a transmit device, a) applying first and second pluralities of streams of symbol signals on a first plurality and a second plurality of transmit antennas, respectively, the first plurality of transmit antennas having a same first polarization and the second plurality of transmit antennas having a same second polarization orthogonal to said first polarization, in a receive device:

b) receiving at least one of the streams of the first plurality and at least one of the streams of the second plurality using together third and fourth pluralities of receive antennas providing third sets and fourth sets of receive signals, respectively, the third plurality of receive antennas having a same third polarization and the fourth plurality of receive antennas having a same fourth polarization orthogonal to said third polarization, c) projecting at least one pair of first and second receive signals belonging to said third and fourth sets, respectively, on a same reference axis for defining a composite signal, d) estimating a quality of the composite signal based on a predetermined quality criterion, and e) rotating the reference axis for determining a correction angle, relating to a first of said receive signals, corresponding to an optimum value of said quality, for which an interference effect of an alignment mismatch between the transmit antennas and the respective receive antennas is at a minimum, wherein the composite signal is considered as being upgraded into a first eigen vector signal representing a first one of two related transmit signals, and f) carrying out a correction action in anyone of said devices, for canceling said interference effect, based on said correction angle.

Thus, since each stream can be detected as eigen vectors, the transmission medium provides two parallel channels. An eigen vector is a vector having a direction which is "devoted" to this vector, i.e. for which another eigen vector has no component on that direction. In the present Euclidian space, these vectors have orthogonal directions.

In a context of spatial multiplexing, the two parallel channels provide data which are synchronous between both channels, and, consequently, the interference on one receive symbol is only due to the "parallel" symbol, on the parallel channel. The process for canceling the interference is thus easy.

This disclosure provides a new concept for providing two channels in parallel.

In fact, in prior art, the bits are transmitted by processing them by batch, each batch defining a symbol signal having two orthogonal components, namely a real component and an imaginary component. It implies a complex processing load for coding the signals and decoding them in the receiver.

An aspect of the disclosure can be regarded as having shifted the load, of providing an orthogonal feature to the signal, from the two electronic ends of the transmission channel (encoder, decoder) to the physical channel. A major advantage is that, once the tilt or needed rotation correction of the antennas is estimated, its value can be kept for the following received data, as long as the antennas are supposed to be maintained in the same orientation. Anyway, would this assumption not be true, the data processing load of an example aspect of the disclosure is however quite limited since it is related to the physical orientation of the antennas. It means that there is no processing of each symbol, since the processing is globally made on the stream. Consequently, the processing rate for tracking the antennas' mutual polarization directions is of many orders of magnitude under the one of symbols processing.

In another way of presentation, an example aspect of the disclosure can provide a slave antenna associated with processing circuits, said slave antenna being always viewed, by the receive decoding circuits, as being parallel with a master, transmit or receive, antenna even if one of these two cooperating antennas changes its direction. It is a wobbly toy effect.

An aspect of the disclosure thus implies two main functions. The first one, which provides the tilt measurement at step e), is located in the receive device. The second one relates to the corrective action to be carried out. This action, for canceling the polarization tilt, can be carried out whether at the "effect" level or at the "cause" level.

At the "effect" level, i.e. the interference due to said tilt, the corrective action can be a signal processing action in the receive device.

At the "cause" level, i.e the tilt, the corrective action can be an action for rotating the polarization direction of the corresponding antenna, whether of the receive device or of the transmit device.

In this latter case, the receiver would determine the relative mismatch or tilt of the receive antennas versus the transmit antennas, step e), and it would transmit back a request, or remote control, message for causing the transmit antennas to tilt according to the needed correction angle. It means that the transmit device would have a receive capability for a service, or beacon, channel.

In fact, it is the radiation field of an antenna which is to be tilted. Consequently, the transmit or receive antenna can be physically tilted by an actuator or tilt compensation elements, like elementary antennas around each antenna, can be provided and more or less activated for canceling, by phase opposition, the unwanted polarization component.

It can easily be understood that an aspect of the disclosure is very useful in a wireless communications system, for instance a cellular telephone system, where the antennas of the portable phone sets are directed in any random direction in use. In such an application, these phone sets can now receive and transmit very high rate data, for instance moving pictures.

In an exemplary embodiment, the correction action is carried out in the receive device, by computing an interference component, of said first receive signal on said second receive signal, based on said correction angle, and subtracting said interference component from said second receive signal for upgrading it into a second eigen vector signal representing a second one of the two related transmit signals.

Thus, the first of said receive signals is used, firstly, as a service signal, for determining the tilt, by computing the first eigen vector signal, and secondly, the first of said receive signals is used as a "payload" signal for transmitting data, together with the second one.

In one example, an interference component, of said second receive signal on said first receive signal, is computed, based on said correction angle, and is subtracted from said first eigen vector in order to improve it into a corrected first eigen vector. The tilt correction is thus improved.

In such a case, an improved interference component, of said corrected first eigen vector on said second receive signal, is computed, based on said correction angle, and is subtracted from said second receive signal for obtaining a corrected second eigen vector signal representing said second one of the two related transmit signals.

Thus, iterations can further amend the results, by amending the eigen vectors.

Preferably, the first plurality and the second plurality are of a same size.

In a same manner, the third plurality and the fourth plurality can be of a same size.

The whole bandwidth is thus maximized.

In one example, the first plurality together with the second plurality are of a same size as the third plurality together with the fourth plurality.

The disclosure also relates to a communications system for transmitting radio signals, including:
  a transmit device, including:
    radio transmit circuits arranged for transmitting first and second pluralities of streams of symbol signals to a first plurality and said second plurality of transmit antennas, respectively, the first plurality of transmit antennas having a same first polarization and the second plurality of transmit antennas having a same second polarization orthogonal to said first polarization,
  at least one receive device, including:
    third and fourth pluralities of receive antennas, for receiving at least one of the streams of the first plurality and at least one of the streams of the second plurality, respectively, and thus providing third sets and fourth sets of receive signals, respectively, the third plurality of receive antennas having a same third polarization and the fourth plurality of receive antennas having a same fourth polarization orthogonal to said third polarization, a first processing circuit, which projects at least one pair of receive signals, belonging to said third and fourth sets, respectively, on a same reference axis for defining a composite signal, a quality circuit, which receives the composite signal and estimating a quality thereof, based on a predetermined quality criterion, a rotation circuit, which rotates the reference axis in order that the quality circuit determines a correction angle, relating to a first of said receive signals, corresponding to an optimum value of said quality, for upgrading the composite signal into a first eigen vector signal representing a first one of two related transmit signals, and a second processing circuit, which computes an interference component, of said first receive signal on said second receive signal, based on said correction angle, and which subtracts said interference component from said second receive signal to obtain into a second eigen vector signal representing a second one of the two related transmit signals.

The first plurality is, for instance, of two first transmit antennas and the second plurality is of two second transmit antennas.

The disclosure also relates to a receive device, including:

first and second sets of at least one receive antenna, for receiving at least one of a first set of streams of symbols and at least one of a second set of streams of symbols, respectively, and thus providing first sets and second sets of at least one receive signal, respectively, the first set of receive antennas having a same first polarization and the second set of receive antennas having a same second polarization orthogonal to said first polarization, a first processing circuit, which projects at least one pair of receive signals, belonging to said first and second sets, respectively, on a same reference axis for defining a composite signal, a quality circuit, which receives the composite signal and estimates a quality thereof, based on a predetermined quality criterion, a rotation circuit, which rotates the reference axis in order that the quality circuit determines a correction angle, relating to a first of said receive signals, corresponding to an optimum value of said quality, for upgrading the composite signal into a first eigen vector signal representing a first one of two related transmit signals, and a second processing circuit, which computes an interference component, of said first receive signal on said second receive signal, based on said correction angle, and subtracts said interference component from said second receive signal to obtain a second eigen vector signal representing a second one of the two related transmit signals.

The receive device is, for instance, a mobile device.

The disclosure also relates to a computer program product which can be downloaded from a communications network and/or stored on a storage medium which can be read by a computer and/or processed by a processor, characterized in that it contains program code instructions for the embodiment of the method according to an aspect of the disclosure, when said program is run on a computer.

Such a computer program product can include instructions useful for the transmit device or useful for the receive device.

The disclosure also deals with a storage medium, which can be read by a computer, storing a set of instructions which can be run on said computer for embodying the method according to an aspect of the disclosure.

The disclosure further relates to a method including:

a) receiving, in a receive device, at least one of a first plurality of streams of symbols and at least one of a second plurality of streams of symbols using together first and second pluralities of receive antennas, providing first sets and second sets of receive signals, respectively, the first plurality of receive antennas having a same first polarization and the second plurality of receive antennas having a same second polarization orthogonal to said first polarization, b) projecting at least one pair of the receive signals belonging to said first and second sets, respectively, on a same reference axis for defining a composite signal, c) estimating a quality of the composite signal based on a predetermined quality criterion, d) rotating the reference axis and determining a correction angle, relating to a first of said receive signals, corresponding to an optimum value of said quality, for which an interference effect of an alignment mismatch between transmit antennas used to transmit the first and second plurality of streams of symbols and the respective receive antennas is at a minimum, wherein the composite signal is considered as being upgraded into a first eigen vector signal representing a first one of two related transmit signals, and e) carrying out a correction action canceling said interference effect, based on said correction angle.

BRIEF DESCRIPTION OF THE DRAWINGS

It is now provided an example of an embodiment of the instant disclosure, which must not be considered as a limitation, in conjunction with drawings, wherein.

DETAILED DESCRIPTION OF ILLUSTRATIVE EMBODIMENTS

1. Mathematical Presentation of Receive Signals, Impacted by a Tilt, or Mismatch, between the Respective Orientations of the Transmit and Receive Antennas In this example, a method according to an aspect of the disclosure is used for designing a MIMO system in which a first plurality (or set) of half (N) the number 2N of transmit antennas of a transmit device, or station, transmit their signals in a first polarization direction 1D and a second plurality (or set) of the other half number N of transmit antennas transmit in a second polarization direction 2D which is the related orthogonal polarization, where N may be any positive integer (N>1). Thus, the transmit signals belong to first and second sets of N transmit signals, respectively, which are considered as orthogonal vectors.

Figure 1:
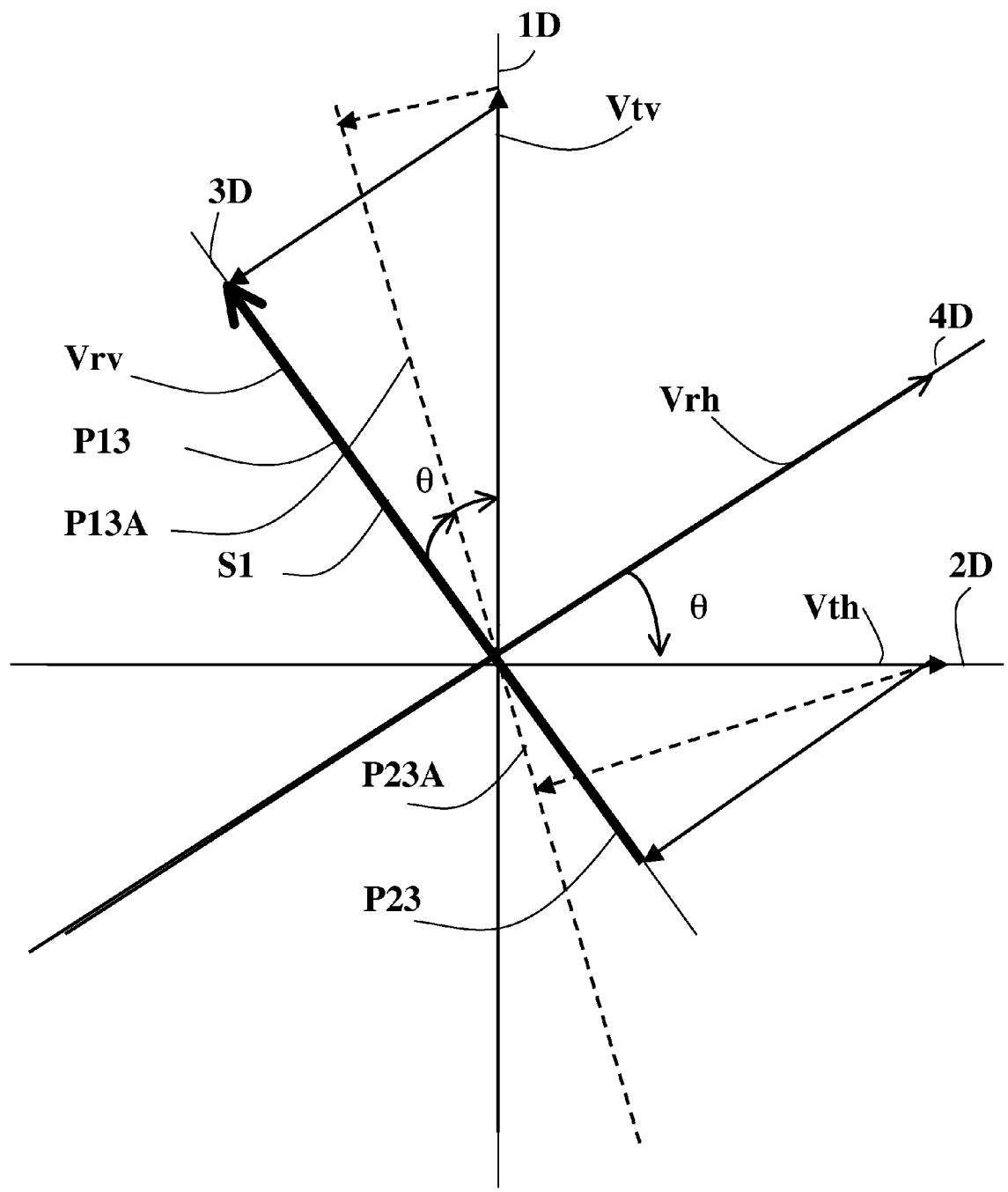
FIG. 1 is a diagram illustrating polarizations of transmit and receive symbol vector signals.
Figure 2:
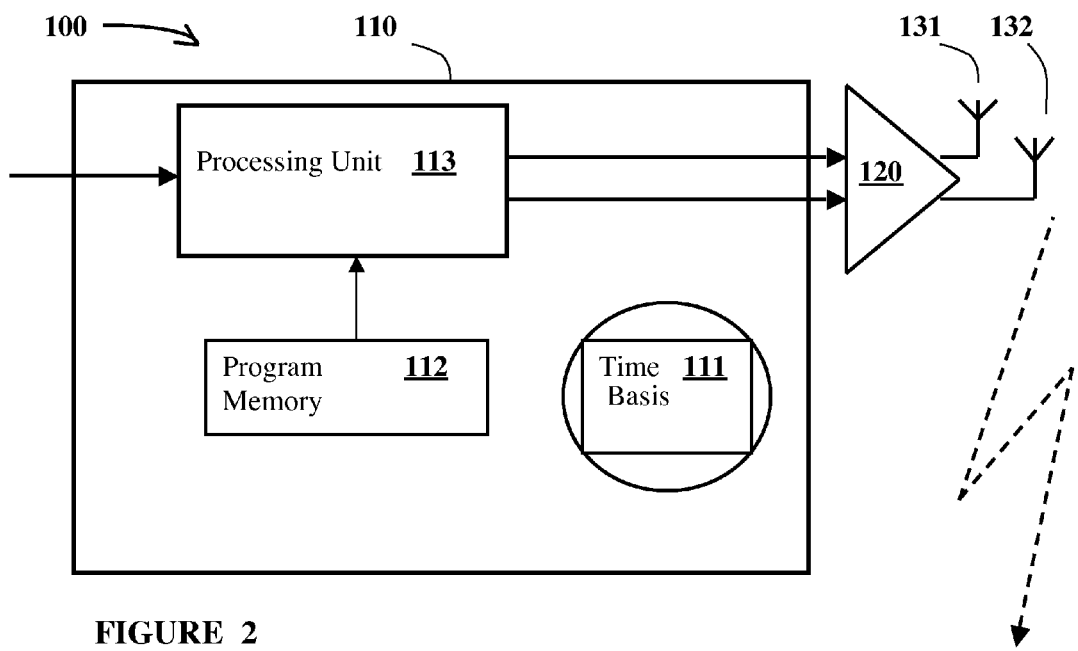
FIG. 2 is a block diagram of a transmit device.

FIG. 1 illustrates a number 2N=2, for the sake of clarity, of vector signals, including a first transmit signal vector Vtv having the first polarization direction 1D, a vertical one, and a second signal transmit vector Vth having the second polarization direction 2D, a horizontal one. These signals are transmitted by a transmit device or a transmit station 100 represented by a block diagram on FIG. 2, through "orthogonal" antennas 131, 132 having the first and second polarization directions 1D, 2D, respectively.

Figure 3:
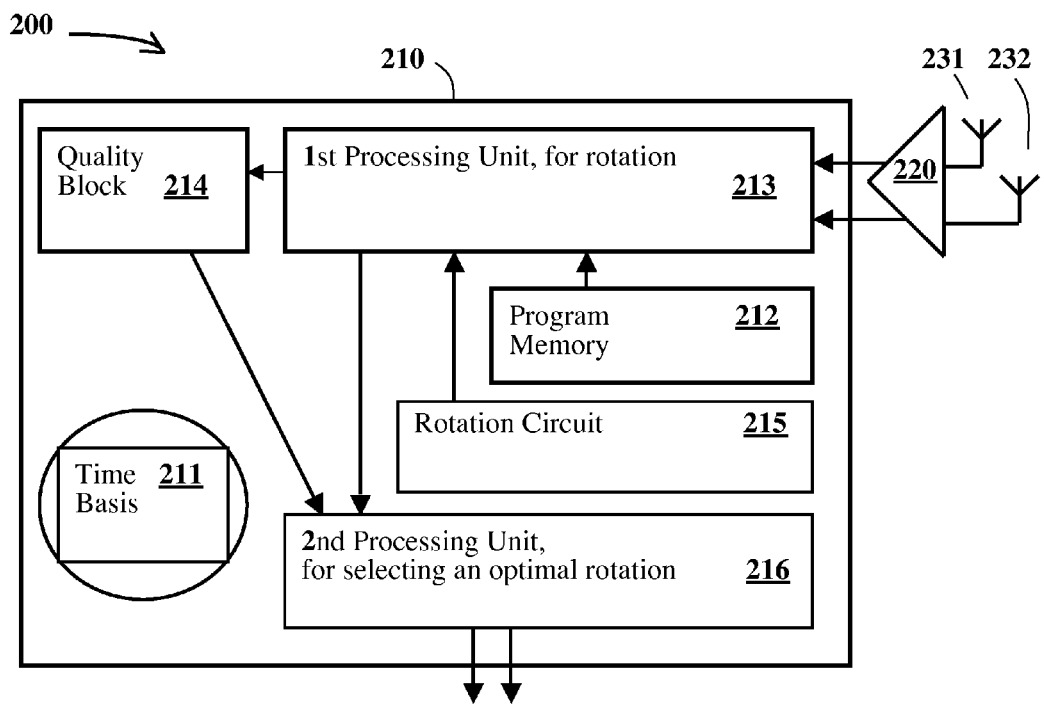
FIG. 3 is a block diagram of a corresponding receive device.

A receive device 200, represented by a block diagram on FIG. 3, receives, correspondingly, two sets of receive signals through 2N=2 "orthogonal" receive antennas 231, 232, having third and fourth polarization directions 3D, 4D, respectively.

In the discussion below, the transmit station 100 and the receive device 200 are supposed to be arranged for also dealing with a number N>1, since, in a general point of view, the value of N is above 1.

For instance, focusing on 4×4 MIMO systems, N=2 antennas 131 transmit in the vertical (V) polarization and the other N=2 transmit antennas 132 transmit in the horizontal (H) polarization. In this description, we focus on the downlink, i.e., a transmission from the base station 100 to at least one fixed or mobile receive terminal or device user(s) 200, but the concept is applicable to both downlink and uplink.

In a similar way, the receive device 200 includes a third plurality of N receive antennas 231, having the third polarization direction 3D, and a fourth plurality of N receive antennas 232, having the fourth polarization direction 4D which is orthogonal to the third polarization direction 3D. In order to communicate at best with the transmit station 100, the first and third polarizations directions 1D, 3D must be parallel, and the same for the second and fourth polarizations directions 2D, 4D.

However, the third and fourth polarization directions 3D and 4D are together tilted by an angle θ versus the corresponding transmit polarizations directions 1D and 2D, respectively.

Consequently, as illustrated on FIG. 1, a "vertical" signal vector $S_i$ represents the sum of a projection component P13, on its third polarization direction 3D, of "vertical" vector Vtv, which was transmitted with the first polarization direction 1D, together with a projection interference component P23, on its third polarization direction 3D, of "horizontal" signal vector Vth, which was transmitted with the second polarization direction 2D.

In a 4×4 MIMO system with the first two antennas 131 transmitting the first set of signals in one polarization and the second two antennas 132 transmitting the second set of signals in the orthogonal polarization, a received signal can be expressed as a set of two vector equations as follows:

$$R_1 = \alpha H_1 S_1 + \beta H_2 S_2 + W_1 \quad (2.a)$$

$$R_2 = \gamma H_3 S_1 + \delta H_4 S_2 + W_2 \quad (2.b)$$

where said signal $S_1$ and signal $S_2$ are the outputs of the code matrices used in the two respective polarization directions 3D, 4D, and the $H_i$, i=1, 2, 3, 4, are 2×2 channel matrices. The value of these matrices are commonly defined by analyzing their influence on the receive signals.

Ideally, $\alpha = \delta = \cos \phi$ and $\beta = -\gamma = \sin \phi$.

φ designates the deviation of the antennas of the mobile receive terminal from a vertical raised from the horizontal plane. The horizontal plane is here defined as being a plane which is orthogonal to the vertical polarization direction 1D (defined by the first plurality of N antennas 131) and, consequently, parallel to the horizontal polarization direction 2D.

This ideal situation corresponds to perfectly orthogonal polarizations 1D and 4D, as well as 2D and 3D, and line-of-sight (LOS) propagation not impacting the individual polarizations. Unfortunately, the polarizations cannot be perfect at mobile terminals and multipath propagation strongly impacts the polarization of the transmitted signal. Therefore, in practice, the matrix $$\begin{pmatrix} \alpha & \beta \\ \gamma & \delta \end{pmatrix}$$

will be close to a rotation matrix number $$\begin{pmatrix} \cos\varphi & \sin\varphi \\ -\sin\varphi & \cos\varphi \end{pmatrix}$$

but it will not be identical to it.

Equations (2.a) and (2.b) can be grouped into a single equation, where the 4×4 matrix and the 4×1 vectors are shown in partitioned form.

$$\begin{pmatrix} R_1 \\ R_2 \end{pmatrix} = \begin{pmatrix} \alpha H_1 & \beta H_2 \\ \gamma H_3 & \delta H_4 \end{pmatrix} \begin{pmatrix} S_1 \\ S_2 \end{pmatrix} + \begin{pmatrix} W_1 \\ W_2 \end{pmatrix} \quad (3)$$

If Spatial Multiplexing, SM, is used in the two polarizations, we have $$S_1 = \begin{pmatrix} s_1 \\ s_2 \end{pmatrix} \text{ and } S_2 = \begin{pmatrix} s_3 \\ s_4 \end{pmatrix},$$

where ($s_1$, $s_2$) are two symbols transmitted by the first pair of antennas and ($s_3$, $s_4$) are the symbols transmitted by the second pair of antennas.

In the case Alamouti codes are used on the two polarizations, the code matrices are $$C_1 = \begin{pmatrix} s_1 & s_2^* \\ s_2 & -s_1^* \end{pmatrix} \text{ and } C_2 = \begin{pmatrix} s_3 & s_4^* \\ s_4 & -s_3^* \end{pmatrix}.$$

Therefore, we will have:

$$S_1 = \begin{pmatrix} s_1 \\ s_2 \end{pmatrix} \text{ and } S_2 = \begin{pmatrix} s_3 \\ s_4 \end{pmatrix}$$

at the symbol time corresponding to the transmission of the first column of the matrices, and $$S_1 = \begin{pmatrix} s_2^* \\ -s_1^* \end{pmatrix} \text{ and } S_2 = \begin{pmatrix} s_4^* \\ -s_3^* \end{pmatrix}$$

at the symbol time corresponding to the transmission of their second column.

When we use the matrix D given by (1), we have $$S_1 = \begin{pmatrix} as_1 + bs_5 \\ as_2 + bs_6 \end{pmatrix} \text{ and } S_2 = \begin{pmatrix} as_3 + bs_7 \\ as_4 + bs_8 \end{pmatrix}$$

at the symbol time corresponding to the transmission of the first column of the matrices, and $$S_1 = \begin{pmatrix} -cs_2^* - ds_6^* \\ cs_1^* + ds_5^* \end{pmatrix} \text{ and } S_2 = \begin{pmatrix} -cs_4^* - ds_8^* \\ cs_3^* + ds_7^* \end{pmatrix}$$

at the symbol time corresponding to the transmission of their second column.

2. Mathematical Transformation and Signal Processing for Estimating and Correcting Said Orientation Mismatch The first stage of receiver processing consists of multiplying the received signal $$\begin{pmatrix} R_1 \\ R_2 \end{pmatrix}$$

by a rotation matrix number $$\begin{pmatrix} \cos\theta & \sin\theta \\ -\sin\theta & \cos\theta \end{pmatrix}$$

where θ is a correction phase angle whose value is swept for finding an optimum of a quality of anyone of the two receive first and second signals $S_1$, $S_2$.

In other words, the best value of the correction angle or parameter θ is determined according to some criterion as to the quality of symbol vector $S_i$ or $S_2$, as explained below.

Using such a rotation matrix is equivalent to projecting the first and second receive signals $S_i$, $S_2$ on a same reference axis 50, on FIG. 1, for defining a composite signal, the first and second receive signals $S_1$, $S_2$ belonging to third and fourth sets of receive signals, respectively, which are considered as orthogonal vectors.

The idea is that, since the matrix $$\begin{pmatrix} \alpha & \beta \\ \gamma & \delta \end{pmatrix}$$

is close to a rotation matrix, multiplication of the received vector signal by an optimized rotation matrix will lead to a minimum interference between the two signals transmitted in parallel on the horizontal (H) and vertical (V) channels. The aim is thus, by amending $S_1$, $S_2$, to provide 2 eigen vectors $X_1$, $X_2$, each one exclusively representing a specific one of the transmitted signals. The matrix multiplication yields:

$$\begin{pmatrix} X_1 \\ X_2 \end{pmatrix} = \begin{pmatrix} \alpha H_1 \cos\theta + \gamma H_3 \sin\theta & \beta H_2 \cos\theta + \delta H_4 \sin\theta \\ -\alpha H_1 \sin\theta + \gamma H_3 \cos\theta & -\beta H_2 \sin\theta + \delta H_4 \cos\theta \end{pmatrix} \begin{pmatrix} S_1 \\ S_2 \end{pmatrix} + \begin{pmatrix} W'_1 \\ W'_2 \end{pmatrix} \quad (4)$$

where $W'_1$ and $W'_2$ denote rotated vector noise terms.

Since each term in the matrix equation above is a 2×2 matrix itself, there exists no value of parameter θ which can perfectly cancel the interference between the two signals transmitted in orthogonal polarizations. Instead, we need to determine the value of the phase parameter θ which minimizes the interference between the two signals.

As stated above, FIG. 1 illustrates the detrimental fact that the tilt, by a phase angle θ, of the third and fourth polarization directions 3D, 4D versus the respective first and second polarization directions 1D, 2D, causes that the signals which are received by each third and fourth antenna 231, 232 are composite ones.

For canceling at best this detrimental effect, a receive process causes an inverse transformation. Signal vectors Vry and Vrh (namely $S_1$, $S_2$) are together rotated by a parameter angle θ which decreases the relative tilt of the third 3D and fourth 4D directions versus the first and second polarization directions 1D, 2D, respectively. Consequently, the useful component P13 is increased into a P13A component, since cos θ is increased when the value of parameter angle θ is decreased by sweeping it in the correct direction, and the interference component P23 is decreased into a P23A component, since sin θ is thus decreased. Eigen vector $X_1$ is thus obtained when angle parameter θ takes an optimal value which brings back the third polarization direction 3D on the first polarization direction 1D, and the same for polarization directions 4D and 2D.

The value of parameter angle θ is swept in a continuous way, up or down, i.e. in the direction causing an increase of the quality. In an alternative way, parameter angle θ takes pseudo random values (sample values, for sampling the corresponding quality) in an angular range of values, in order to determine a best portion of said range and then an angular density of sample values is increased there, for locating an optimum position of the parameter angle θ leading to the optimum quality.

3. Quality of First Receive Symbol Signal Vector $S_1$

Assume that we wish to estimate the symbol vector $S_1$ first.

In that case, the phase angle θ must be determined so as to maximize the quality, i.e. the useful signal magnitude $\|\alpha H_1 \cos\theta + \gamma H_3 \sin\theta\|$ while minimizing the magnitude of the interference term $\|\beta H_2 \cos\theta + \delta H_4 \sin\theta\|$, where $\|\bullet\|$ some suitable matrix norm. More precisely, the receiver computes the signal-to-interference ratio (SIR), or, better, the signal-to-noise-plus-interference-ratio (SNIR), for different values of the phase θ and determines the optimum value of this phase. For a given value of the phase θ, the SIR is given by:

$$SIR(\theta) = \frac{\|\alpha H_1 \cos\theta + \gamma H_3 \sin\theta\|}{\|\beta H_2 \cos\theta + \delta H_4 \sin\theta\|}.$$

Similarly, the SNIR is given by:

$$SNIR(\theta) = \frac{\|\alpha H_1 \cos\theta + \gamma H_3 \sin\theta\|}{\|\beta H_2 \cos\theta + \delta H_4 \sin\theta\| + \sigma_w^2/\sigma_s^2}$$

where $\delta_s^2$ and $\delta_w^2$, denote the signal and noise power, respectively. Note that, to avoid "division" operations that are complex to implement, the receiver can compute the logarithm of these quantities, which involves subtractions instead of divisions.

4. Estimation of One Symbol Vector $S_1$

Using the optimized phase parameter θ, the receiver makes an estimate of the symbol represented by the amended first symbol vector $S_1$, now better presented as the eigen vector $X_1$.

This estimate is done by using well-known receiver techniques for the space-time code used. The symbol estimation is carried out at each symbol period in SM and every two symbol periods in Alamouti's STC and in Matrix D. This estimation is thus made in the presence of some residual interference, because the receiver cannot completely eliminate the interference term in equation (4).

Once an estimate of the first symbol vector $S_1$ is obtained, the interference of first symbol vector $S_1$ on second symbol vector $S_2$ is removed and the second symbol vector $S_2$ is estimated, in the same way, using well-known techniques for the space-time code at hand.

In an example embodiment, the receiver makes one or more iterations. That is, after estimating the second symbol vector $S_2$, it cancels the interference of second symbol vector $S_2$ on first symbol vector $S_1$ and makes a new decision on first symbol vector $S_1$, and so forth.

The process described above is also applicable to other dimensions. In a 2K×2K MIMO system where K is an arbitrary integer, the first K transmit antennas and K receive antennas form a K×K MIMO system in one polarization and other K transmit antennas and K receive antennas form a K×K MIMO system in the other polarization, and the interference between the two systems is cancelled at the receiver as described above for the 4×4 MIMO system.

In a 2×2 MIMO system using this concept, the signals spatially multiplexed using the H and V polarizations are scalars (single input single output signals). In that particular case, the phase parameter θ involved in the first stage of the receiver can be computed to completely cancel interference of one signal on the other.

As evidenced above, the method is carried out by circuits having specific features, for example.

Consequently, the transmit device or station 100 includes a central unit 110 receiving one or many incoming data streams to be transmitted by radio. The central unit 110 includes a time basis 111 associated with a program memory 112 commanding a processing unit 113 which controls radio transmit circuits 120. In a usual way, the processing unit 113 encodes an incoming data stream into symbol signals representing a batch of bits, and these symbol signals are transmitted to the transmit circuits 120. Memory 112 controls all the steps for processing the transmit signals. Memory 112 can be of any kind of medium, for instance a RAM memory, a hard disk, and can be a mobile medium to be plug in a computer for running the process. Memory 112 can also be arranged for allowing the process program code instructions be downloaded through a data network.

Transmit circuits 120 are arranged for applying said first and second pluralities of streams of symbol signals on a first plurality and second plurality of transmit antennas 131, 132, respectively, the first plurality of transmit antennas 131 having a same first polarization direction 1D and the second plurality of transmit antennas 132 having a same second polarization direction 2D orthogonal to said first polarization direction 1D.

The receive device 200 includes a central unit 210 including a time basis 211 and a program memory 212 for controlling all the steps, listed below, for processing the receive signals. Memory 212 can be of any kind of medium, for instance a RAM memory, a hard disk, and can be a mobile medium to be plug in a computer for running the process. Memory 212 can also be arranged for allowing the process program code instructions be downloaded through a data network.

The central unit 210 is fed by receive circuits 220 which are arranged for receiving at least one of the streams of the first plurality and at least one of the streams of the second plurality, using together third and fourth pluralities of receive antennas 231, 232 for providing third sets and fourth sets of receive signals, respectively, the third plurality of receive antennas 231 having the same third polarization direction 3D and the fourth plurality of receive antennas 232 having the same fourth polarization direction 4D orthogonal to said third polarization direction 3D.

In the central unit 210, a first processing circuit 213, for rotation computing, takes into consideration at least one pair of receive signals $S_1$, $S_2$ belonging to said third and fourth sets, respectively, it means that they are considered as orthogonal vectors Vrv, Vrh, and said processing circuits 213 project said pair of signals on a same reference axis 50 for defining a composite signal.

A quality circuit 214 receives the composite signal and determines an estimate of a quality of the composite signal, based on a predetermined quality criterion.

A rotation circuit 215 causes the reference axis 50 to progressively rotate for determining a correction angle θ, relating to a first ($S_1$) of said receive signals, corresponding to an optimum value of said quality provided by the quality circuit 214, and thus the composite signal is considered as being upgraded into a first eigen vector signal ($X_1$) representing a first one of two related transmit signals.

A second processing circuit 216, for selecting an optimal rotation, computes an interference component, of said first receive signal ($S_1$) on said second receive signal ($S_2$), based on said correction angle (θ), and it is subtracted from said second receive signal ($S_2$) for upgrading it into a second eigen vector signal ($X_2$) representing a second one of the two related transmit signals.

In this example, the second processing circuit 216 receives, in succession, each of the symbol signals processed by the first processing circuit 213 for each value of the correction angle θ, each symbol signal being labeled with a quality note provided by the quality circuit 214. If the values of the correction angle θ are swept in a progressive way, i.e. in an ordered way of increase or decrease, only the three last labeled symbol signals have to be stored for detecting if the second one is a maximum value versus the third and first ones.

In the above explanation, the magnitude of the final correction angle θ is equal to the tilt value, and the respective signs are opposite ones. Consequently, the tilt is cancelled by a subtractive correction.

It should however be noted that, if the tilt is above 45 degrees, a slope of a curve representing the quality, when the correction angle θ is varied, would increase towards a value corresponding to a correction which would not cancel the tilt but which would add a positive correction for reaching 90 degrees. In such a condition, the roles of third and fourth antennas 231, 232 would be permutated. Consequently, in a general point of view, the correction brings the tilt to a value which is an integer of π/2. These circuits 210-216 also deal with the other, annex, features listed in the beginning of the specification.

5. Alternatives

In the above description, the transmit antennas 131, 132 and the receive antennas 231, 232 have the same size in terms of total number of antennas. Further, the receiver 200 is dedicated to the transmitter 100.

Further, the total number is odd and it is split into two equal numbers, each channel having a "twin", orthogonal, channel.

It must be noted that these statements are only for an optimum of efficiency in transmission.

Firstly, the receiver could only receive some of the transmit streams, and it could also receive other streams from other transmitters. Consequently, the method according an example embodiment would be used for the streams of one transmitter, whereas the streams of any other transmitter could also be processed according to an example embodiment. If the transmit antennas of the transmitters are mutually perfectly parallel or orthogonal, the result (phase parameter θ) obtained when processing the symbol signals received from one transmitter could be used for amending the symbol signals received from the other transmitter.

Secondly, the number of antennas in the horizontal plane could differ from the number of antennas polarized in the vertical plane. In that case, the use of the transmission channel would not be optimal, since some streams would not be associated with a "twin".

6. Conclusion

An exemplary embodiment of the present disclosure provides a method for limiting an increase of the complexity factor.

In this context, for instance, one specific aim, although not limiting the range of the disclosure and/or any of the issued claims, would be to provide a design concept which simplifies the implementation of 4×4 MIMO systems to the level of the complexity of 2×2 MIMO systems, or to provide a solution for 2K×2K MIMO system designs whose optimum detection complexity would be on the same order of magnitude as that of K×K MIMO systems.

Although the present disclosure has been described with reference to one or more examples, workers skilled in the art will recognize that changes may be made in form and detail without departing from the scope of the disclosure and/or the appended claims.

What is claimed is:

1. A method for transmitting radio signals, including the following steps:
   from a transmit device:
   a) applying first and second pluralities of streams of symbol signals on a first plurality and a second plurality of transmit antennas, respectively, the first plurality of transmit antennas having a same first polarization and the second plurality of transmit antennas having a same second polarization orthogonal to said first polarization,
   in a receive device:
   b) receiving at least one of the streams of the first plurality and at least one of the streams of the second plurality using together third and fourth pluralities of receive antennas providing third sets and fourth sets of receive signals, respectively, the third plurality of receive antennas having a same third polarization and the fourth plurality of receive antennas having a same fourth polarization orthogonal to said third polarization,
   c) projecting at least one pair of receive signals belonging to said third and fourth sets, respectively, on a same reference axis for defining a composite signal,
   d) estimating a quality of the composite signal based on a predetermined quality criterion,
   e) rotating the reference axis and determining a correction angle, relating to a first of said receive signals, corresponding to an optimum value of said quality, for which an interference effect of an alignment mismatch between the transmit antennas and the respective receive antennas is at a minimum, wherein the composite signal is considered as being upgraded into a first eigen vector signal representing a first one of two related transmit signals, and
   f) carrying out a correction action in any one of said devices, for canceling said interference effect, based on said correction angle.

2. The method according to claim 1, wherein the correction action is carried out in the receive device, by computing an interference component, of said first receive signal on said second receive signal, based on said correction angle, and subtracting said interference component from said second receive signal for generating a second eigen vector signal representing a second one of the two related transmit signals.

3. The method according to claim 2, wherein an interference component, of said second receive signal on said first receive signal, is computed, based on said correction angle, and is subtracted from said first eigen vector in order to obtain a corrected first eigen vector.

4. The method according to claim 2, wherein an interference component, of said second receive signal on said first receive signal, is computed, based on said correction angle, and is subtracted from said first eigen vector in order to obtain a corrected first eigen vector, and wherein an improved interference component, of said corrected first eigen vector on said second receive signal, is computed, based on said correction angle, and is subtracted from said second receive signal for obtaining a corrected second eigen vector signal representing said second one of the two related transmit signals.

5. The method according to claim 1, wherein the first plurality and the second plurality are of a same size.

6. The method according to claim 1, wherein the third plurality and the fourth plurality are of a same size.

7. The method according to claim 1, wherein the first plurality together with the second plurality are of a same size as the third plurality together with the fourth plurality.

8. A communications system for transmitting radio signals, the communications system comprising:
   a transmit device, including:
      radio transmit circuits arranged for transmitting first and second pluralities of streams of symbol signals to a first plurality and a second plurality of transmit antennas, respectively, the first plurality of transmit antennas having a same first polarization and the second plurality of transmit antennas having a same second polarization orthogonal to said first polarization,
   at least one receive device, including:
      third and fourth pluralities of receive antennas, for receiving at least one of the streams of the first plurality and at least one of the streams of the second plurality, respectively, and thus providing third sets and fourth sets of receive signals, respectively, the third plurality of receive antennas having a same third polarization and the fourth plurality of receive antennas having a same fourth polarization orthogonal to said third polarization,
      a first processing circuit, which projects at least one pair of receive signals, belonging to said third and fourth sets, respectively, on a same reference axis to define a composite signal,
      a quality circuit, which received the composite signal and estimating a quality thereof, based on a predetermined quality criterion,
      a rotation circuit, which rotates the reference axis in order that the quality circuit determines a correction angle, relating to a first of said receive signals, corresponding to an optimum value of said quality, for upgrading the composite signal into a first eigen vector signal representing a first one of two related transmit signals,
      a second processing circuit, which computes an interference component, of said first receive signal on said second receive signal, based on said correction angle, and which subtracts said interference component from said second receive signal to obtain a second eigen vector signal representing a second one of the two related transmit signals.

9. The communications system according to claim 8, wherein the first plurality is of two first transmit antennas and the second plurality is of two second transmit antennas.

10. The communications system according to claim 8, wherein the receive device is a mobile device.

11. A receive device for a communications system, including:
- first and second sets of at least one receive antenna, for receiving at least one of a first set of streams of symbols and at least one of a second set of streams of symbols, respectively, and thus providing first sets and second sets of at least one receive signal, respectively, the first set of receive antennas having a same first polarization and the second set of receive antennas having a same second polarization orthogonal to said first polarization,
- a first processing circuit, which projects at least one pair of receive signals, belonging to said first and second sets, respectively, on a same reference axis for defining a composite signal,
- a quality circuit, which receives the composite signal and estimates a quality thereof, based on a predetermined quality criterion,
- a rotation circuit, which rotates the reference axis in order that the quality circuit determines a correction angle, relating to a first of said receive signals, corresponding to an optimum value of said quality, for upgrading the composite signal into a first eigen vector signal representing a first one of two related transmit signals, and
- a second processing circuit, which computes an interference component, of said first receive signal on said second receive signal, based on said correction angle, and subtracts said interference component from said second receive signal to obtain a second eigen vector signal representing a second one of the two related transmit signals.

12. A non-transitory computer-readable storage medium comprising program code instructions stored thereon, which when executed by a computer perform a method of transmitting radio signals, wherein the method comprises:
a) receiving, in a receive device, at least one of a first plurality of streams of symbols and at least one of a second plurality of streams of symbols using together first and second pluralities of receive antennas, providing first sets and second sets of receive signals, respectively, the first plurality of receive antennas having a same first polarization and the second plurality of receive antennas having a same second polarization orthogonal to said first polarization,
b) projecting, with the computer, at least one pair of the receive signals belonging to said first and second sets, respectively, on a same reference axis for defining a composite signal,
c) estimating, with the computer, a quality of the composite signal based on a predetermined quality criterion,
d) rotating, with the computer, the reference axis and determining a correction angle, relating to a first of said receive signals, corresponding to an optimum value of said quality, for which an interference effect of an alignment mismatch between transmit antennas used to transmit the first and second plurality of streams of symbols and the respective receive antennas is at a minimum, wherein the composite signal is considered as being upgraded into a first eigen vector signal representing a first one of two related transmit signals, and
e) carrying out a correction action canceling said interference effect, with the computer, based on said correction angle.

13. A method comprising:
a) receiving, in a receive device, at least one of a first plurality of streams of symbols and at least one of a second plurality of streams of symbols using together first and second pluralities of receive antennas, providing first sets and second sets of receive signals, respectively, the first plurality of receive antennas having a same first polarization and the second plurality of receive antennas having a same second polarization orthogonal to said first polarization,
b) projecting at least one pair of the receive signals belonging to said first and second sets, respectively, on a same reference axis for defining a composite signal,
c) estimating a quality of the composite signal based on a predetermined quality criterion,
d) rotating the reference axis and determining a correction angle, relating to a first of said receive signals, corresponding to an optimum value of said quality, for which an interference effect of an alignment mismatch between transmit antennas used to transmit the first and second plurality of streams of symbols and the respective receive antennas is at a minimum, wherein the composite signal is considered as being upgraded into a first eigen vector signal representing a first one of two related transmit signals, and
e) carrying out a correction action canceling said interference effect, based on said correction angle.

\* \* \* \* \*